April 16, 1929.  C. T. HOWSON  1,709,018
COFFEE GRINDER
Filed May 6, 1926   5 Sheets-Sheet 1

Charles T. Howson, Inventor.
By Emil Heuhart,
Attorney.

Witness:
J. J. Oberst.

April 16, 1929.  C. T. HOWSON  1,709,018
COFFEE GRINDER
Filed May 6, 1926   5 Sheets-Sheet 2

Charles T. Howson, Inventor.
By Emil Kenhart
Attorney.

Witness:
J. J. Oberst,

April 16, 1929.  C. T. HOWSON  1,709,018
COFFEE GRINDER
Filed May 6, 1926  5 Sheets-Sheet 4

Charles T. Howson, Inventor.
By Emil Kunhardt
Attorney.

Witness:
J. J. Oberst,

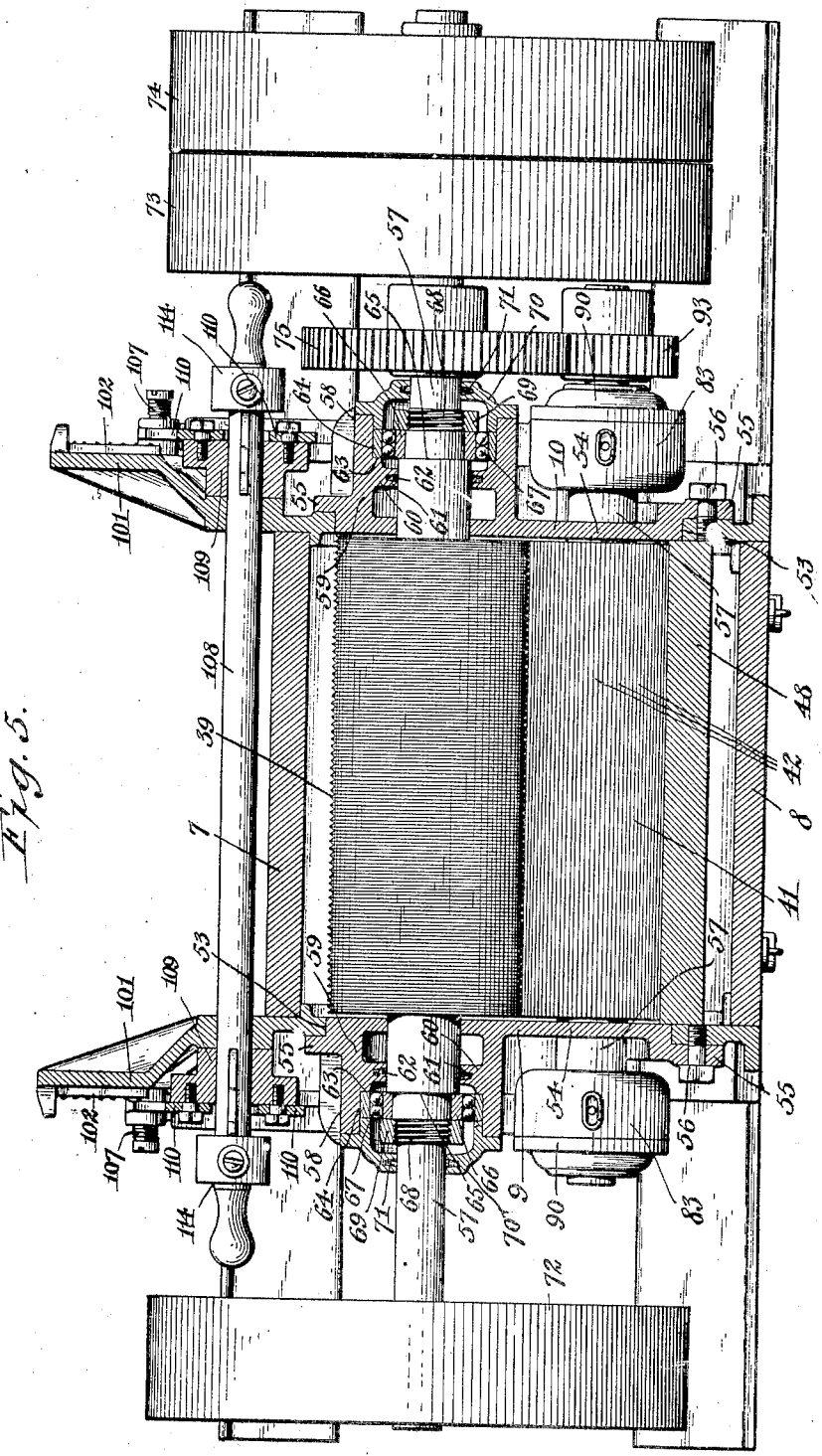

Patented Apr. 16, 1929.

1,709,018

UNITED STATES PATENT OFFICE.

CHARLES T. HOWSON, OF SILVER CREEK, NEW YORK, ASSIGNOR TO HUNTLEY MANUFACTURING CO., OF SILVER CREEK, NEW YORK, A CORPORATION OF NEW YORK.

COFFEE GRINDER.

Application filed May 6, 1926. Serial No. 107,093.

My invention relates to coffee grinding machines, and more particularly to that type usually surmounting a coffee separator and driven from a part of the latter.

One of the objects of my invention is to provide a coffee grinding machine in which a plurality of rolls is employed and so driven that one or at least one of said rolls is driven at a slower speed than the remaining roll or rolls, and in which rolls are preferably arranged in a set of three, one being corrugated circumferentially and driven at a slower speed than the remaining two rolls, the latter being preferably corrugated lengthwise; the purpose of the differential speed imparted to the rolls being to automatically keep the rolls clean.

Another object of my invention is to provide in a coffee grinder, indicating means whereby the relative positions of the grinding rolls are indicated, the whole being arranged so that the indicating means are arranged to indicate zero; and wherein, when the indicating means is so set, the rolls may be set tight together, or knowingly otherwise arranged, making it unnecessary to employ a feeler gage usually found necessary to determine the relative positions of the rolls.

A further object of my invention is to provide releasing mechanism whereby a quick release is provided, to be used for the purpose of separating the rolls in the event that large foreign matter is fed between them; said releasing mechanism being also utilized to separate the rolls after grinding operation ceases and before stopping; also so that when the machine is again started it will set into action under what may be termed a "no-load" condition.

A further object of my invention is to provide releasing mechanism whereby a quick release is assured for separating the grinding rolls, said releasing mechanism being provided with means allowing slight separation of the rolls without throwing the releasing mechanism into active position, thus permitting the passage of small hard objects between the rolls without causing any portion of the quick releasing mechanism to operate.

A still further object of my invention is to improve on coffee grinding machines now in use, to simplify the construction, and to render the grinding operation more effective and efficient.

With the above and other objects in view to appear hereinafter, the invention consists in the novel features of construction and in the arrangement and combination of parts to be hereinafter described and more particularly pointed out in the subjoined claims.

In the drawings:—

Fig. 5 is a horizontal section taken on line 5—5, Fig. 1.

Fig. 6 is a horizontal section taken through one end of the machine on line 6—6, Fig. 1.

Figure 1:
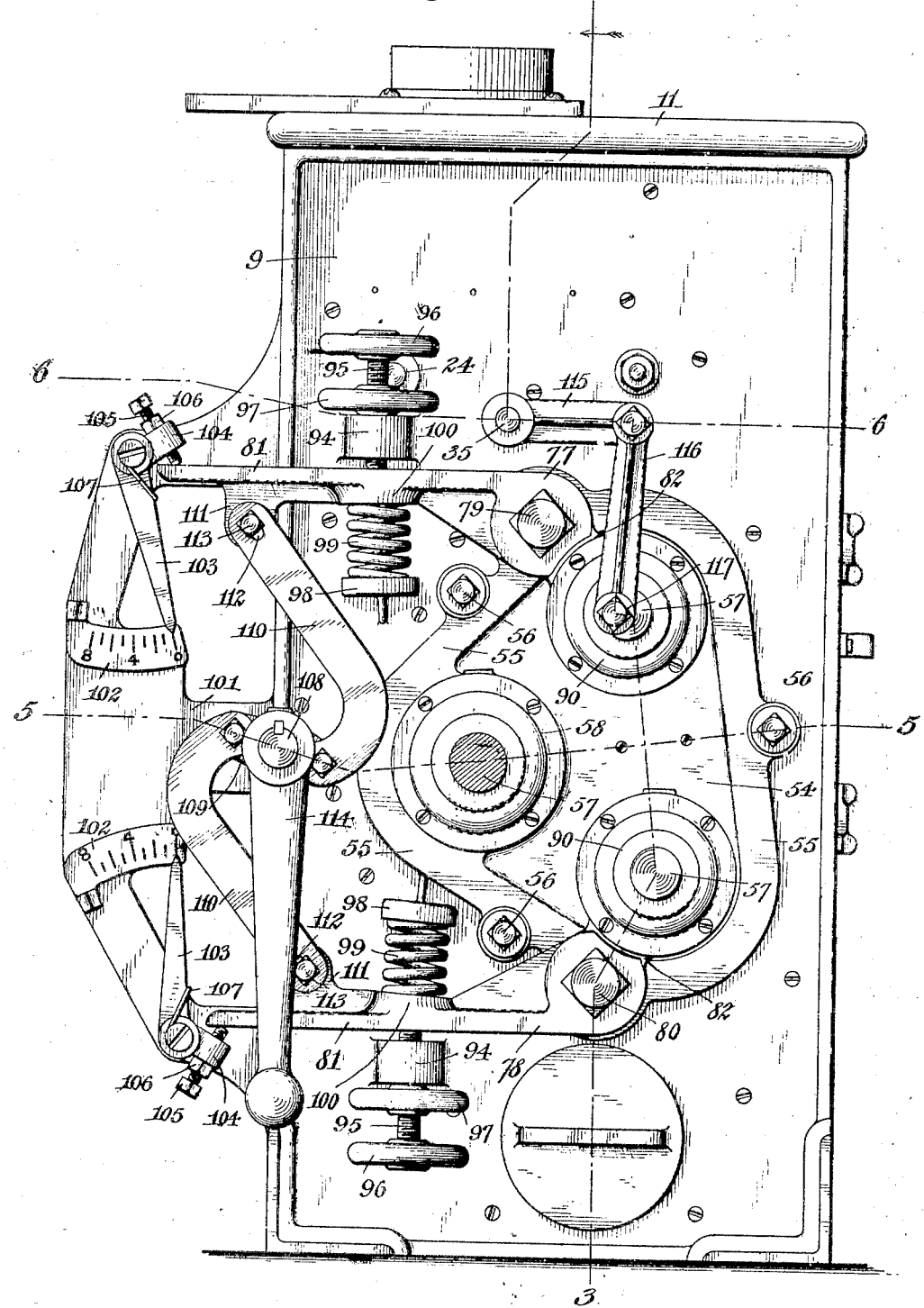
Fig. 1 is an elevation, viewed from one end of the machine.

The machine comprises a casing having side walls 7, 8, which may be constructed of wood or other suitable material, and end walls 9, 10, respectively, preferably cast. It also has a top wall 11 provided with an inlet or feed opening 12 through which the coffee or other stock is delivered into the machine to be ground. A secondary or return inlet opening 13 is also provided in the top wall 11; and arranged within the upper portion of the machine is a wall or partition 14 forming a return hopper 15 beneath the opening 13.

The interior wall or partition 14 extends from the top wall downwardly and is inclined toward the side wall 8 so as to cause a gradual downward restriction of the return hopper 15, and between said wall or partition 14 and the other side 8 of the casing, a receiving hopper 16 is arranged, this hopper having a downwardly and inwardly inclined wall 17 extending from the side wall 8 of the casing and also an oppositely-inclined wall 18 extending from the interior wall or partition 14. These walls, therefore, converge downwardly and they are separated at their lower ends to permit the interposition of suitable control or valve mechanism, to be hereinafter described.

The upper inclined surface of the converging walls 17 and 18 are covered with thin sheet metal 19, which extends below the lower edges of said walls, and the inner side of the wall 8 between the inclined wall 17 and the top wall 11 of the casing is also faced with thin sheet metal 20, while that portion of the side of the interior wall or partition 14 extending from the inclined wall 18 to said top wall 11 is faced with similar material 21. The sheet metal 20, 21 may be said to be continuations of the sheet metal 19 applied to the upper inclined surfaces of the inclined or converging walls 17 and 18.

The spacing of the converging walls 17, 18 provides a discharge opening 22 for the receiving hopper 16, and arranged at one side of said opening is an adjustable feed valve 23 pivotally mounted in the end walls 9, 10 of the casing, as at 24. This feed valve is disposed in inclined position and may be said to form a continuation of the inclined wall 17, although the upper end thereof is slightly spaced from the lower edge of said inclined wall 17, as at 25. The sheet metal facing the upper surface of said inclined wall 17 overlaps the adjustable feed valve. The latter is preferably constructed of cast iron and held in any inclined position by an adjusting screw 26 extending through an opening in the side wall 8 of the casing and threaded through a casting 27 fastened in any suitable manner to the outer side of said side wall. Said adjusting screw has a winged head 28 at its outer end for conveniently manipulating the same, and a lock nut 29 is arranged on said adjusting screw and adapted to bear against the threaded casting 27, said lock nut having a wing 30 for conveniently rotating the same on said adjusting screw.

The inner end of said adjusting screw engages a depression 31 formed in a boss or extension 32 on the outer or under side of the adjustable feed valve 23. The lower end of said adjustable feed valve is spaced from the lower edge of the inclined wall 18 of the hopper 16, and between the two is a vibrating feed valve 33 pivotally mounted for rocking movement in the end walls 9, 10 of the casing, as at 34. The lower edge of said vibrating feed valve is in close proximity to the inner or upper surface of the adjustable feed valve 23 near its lower end, and the upper edge thereof is spaced from the lower edge of the inclined wall 18 of the receiving hopper 16.

The portion of the sheet metal 19, which extends below the lower edge of said inclined wall 18 overlaps the vibrating feed valve 33 and spans the opening between the upper edge of said valve and the lower edge of said wall 18. The extending portions of the sheet metal 19 on the two inclined walls 17, 18 therefore prevent the coffee, or other material delivered into the receiving hopper from passing between the lower edges of said walls and the upper edges of the valves 23 and 33, respectively.

Figure 3:
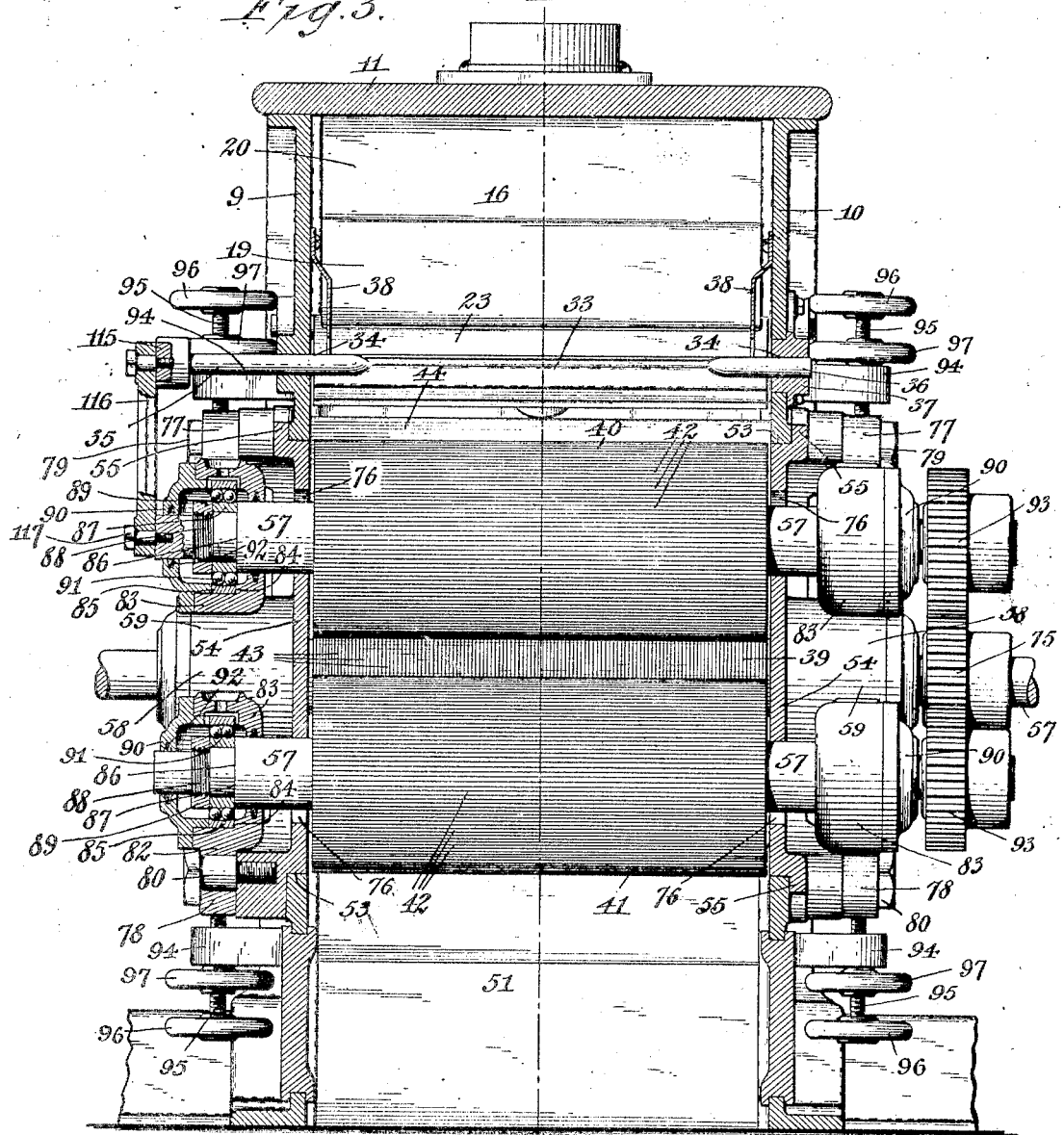
Fig. 3 is a transverse section taken on or about line 3—3, Fig. 1, looking in the direction of the arrow crossing said line.

The manner of pivoting the vibrating feed valve in the side walls is by means of trunnions 35, 36 extending from opposite ends of said vibrating feed valve, the trunnion 35 being mounted directly wthin one end wall of the casing and the trunnion 36 within a casting 37 secured by means of bolts, or otherwise, to the opposite end wall of said casing, said casting having a portion fitting into said last-mentioned end wall, as clearly shown in Fig. 3. The trunnion 35 is somewhat longer than the trunnion 36 and extends outwardly a distance beyond the end wall in which it is mounted and has connection to operating mechanism, to be hereinafter described.

On the inner side of the end walls, sheet metal guards 38 are secured, these guards being shaped to fit between the inclined or converging walls 17, 18 of the receiving hopper and having their lower portions spaced from said end walls so as to prevent coffee or other material delivered into the receiving hopper from passing between said end walls and the ends of the adjustable feed valve 23 and vibrating feed valve 33.

Arranged within the casing beneath the receiving hopper are three grinding rolls 39, 40 and 41. These rolls are arranged in triangular relation, two of said rolls being adjustable toward and from the third. The grinding rolls 40 and 41 are provided with fine longitudinal corrugations 1, 2 while the grinding roll 39 has fine circumferential corrugations 43.

Disposed underneath the inclined wall 17 of the receiving hopper and the adjustable feed valve 22, is a stock-directing wall 44, which extends from one of the side walls to within close proximity of the periphery of the circumferentially corrugated grinding roll 39 at or near the crest of the same. The grinding roll 39 has a fixed position within the casing, while the grinding rolls 40 and 41 are adjustably mounted within the end walls of said casing in a manner and for a purpose to be hereinafter described. The grinding roll 40 has its axis in a higher plane than that of the grinding roll 39 and is disposed at approximately an angle of 45 degrees thereto, while the grinding roll 41 has its axis in a lower plane than that of the grinding roll 39 and is preferably disposed at an angle of less than 45 degrees thereto. The exact angular relation of the grinding rolls, however, is not considered absolutely necessary so long as a pass 45 is provided between the grinding rolls 39 and 40, to which stock delivered from the receiving hopper is directed by the stock-directing wall 44 and by the grinding roll 40, said stock-directing wall and grinding roll 40 forming substantially opposed walls of an auxiliary hopper 46 leading to the pass 45.

The interior wall or partition 14 serving as one wall of the return hopper 15 terminates to one side of the grinding roll 40, and between the lower end of said wall and the adjacent side wall of the casing an outlet 47 is provided for said hopper. Arranged beneath the return hopper and disposed at substantially a reverse angle to the inclined wall 14 of the return hopper is an inclined wall 48, which extends from said side wall to a point in close proximity to the periphery of the grinding roll 41, and the material delivered from said return hopper is directed against said inclined wall 48 and by the latter against the grinding roll 41 which carries it to a pass 49 between said grinding roll and the grinding roll 39.

One of the walls of the casing is inclined inwardly and downwardly, as at 50, from a point approximately midheight and serves as one wall of a delivery hopper 51. Extending inwardly from the other side wall from a point near its lower end to the bottom of the casing is an inclined wall 52 which serves as another wall of the delivery hopper while the end walls of the casing serve as the remaining walls of said hopper.

Each of the end walls has a substantially triangular opening 53 formed herein, and closing these openings are bearing plates or members 54 which have offset flanges 55 overlying and secured to the end walls by means of bolts 56, or otherwise. In a broad sense, these bearing plates may be considered as forming part of the end walls 9 and 10 of the casing.

The grinding rolls have end trunnions 57 and the permanently stationed or fixed grinding roll 39 is journaled in transversely alined bearings 58, in part formed integral with said bearing plates or members 54 and in part carried by said plates or members, each of said bearings being formed of a cylindrical housing or sleeve extension 59 integral with its bearing plate and provided with an annular internal flange 60 having an annular groove 61 formed in its inner periphery into which suitable packing 62 is placed, said packing bearing against the end trunnions 57 and preventing the escape of coffee dust outwardly along said end trunnions and the admission of foreign matter inwardly along the same, which foreign matter might, if allowed to enter the casing, contaminate the ground coffee. This integral bearing housing 59 is provided with an internal outwardly-facing shoulder 63 against which the outer raceway 64 of a ball bearing is seated. Each of said trunnions is reduced in diameter to form an outwardly-facing shoulder 65 against which the inner raceway 66 of said bearing is seated, and between said outer and inner ball raceways, an annular series of anti-friction balls 67 is arranged. The reduced portion of the end trunnions are threaded, as at 68, and on these threaded portions, nuts 69 are secured, which bear against the outer ends of the inner ball raceways, forcing said raceways firmly against the shoulders 65 of said trunnions.

The cylindrical housings 59 are closed by caps 70 which fit into said housings and bear against the outer ball raceways to hold them against the shoulders 63 of said housings. These caps are provided with packing 71 which bear against said trunnions and serve to prevent the entrance of foreign matter along the same.

The trunnions 57 of the grinding roll 39 extend outwardly through said bearing housings a considerable distance, and to the end of one of said trunnions a drive pulley 72 is secured, and as the grinder is adapted to be mounted on a coffee separator having rotatable parts, said pulley may have a belt passing around it and a pulley forming part of said separator for rotating an element thereof. On the outer end of the other end trunnion of said grinding roll 39, tight and loose pulleys 73, 74, respectively, are mounted, the tight pulley being keyed or otherwise fastened to the shaft, while the loose pulley is applied thereto in the conventional manner. It is, of course, apparent that the pulley 72 may be dispensed with and the loose and tight pulleys utilized to operate the machine; or the loose and tight pulleys may be dispensed with and the pulley 72 utilized as the main driving element of the machine. When, however, the machine is operated in connection with a separator, and especially when mounted on a separator and feeding into it, the use of all of said pulleys may be found desirable.

Fastened onto one of the trunnions 57 in close proximity to its cylindrical housing 59 is a gear wheel 75.

Each of the bearing plates or members 55 has elongated openings 76 formed therein through which the trunnions 57 of the grinding rolls 40, 41 extend. Pivotally secured to the bearing plates or members 54 at opposite ends of the machine are bearing levers 77, 78, the bearing levers 77 being pivotally secured to said bearing plates or members at their upper ends by means of pivot bolts 79, while the bearing levers 78 are pivotally secured to the lower ends of said bearing plates or members by means of pivot bolts 80. Each of these bearing levers is of angular formation and has a long arm 81 and a short arm 82, the pivots 79 and 80 of said levers being arranged at the angles thereof. The long arms of these several levers are disposed in substantially horizontal positions while the short arms extend at an obtuse angle thereto, the short arm of the upper bearing levers extending downwardly and outwardly from the pivots of said levers, while the short arms of the lower bearing levers extend upwardly and outwardly.

Formed integral with the short arm of each lever is a bearing housing 83 having an integral shoulder 84 against which the outer raceway 85 of a ball bearing is seated. Each of the end trunnions 57 of the adjustable rolls 40, 41 is reduced in diameter at its outer end to form an outwardly-facing shoulder 86, and on the reduced portion of each trunnion is fitted the inner raceway 87 of the ball bearing, said inner raceway bearing against said outwardly-facing shoulder 86. The reduced portion of each of said trunnions is threaded, as at 88, and a nut 89 applied to said threaded portion which bears against the outer end of said inner raceway. Each of these bearing housings 83 has a cap 90 applied to its outer end, the cap extending into said housing and bearing against the outer end of the outer raceway. By the use of this cap and the nut 89, the inner and outer raceways are retained in position. Between these raceways an annular series of anti-friction balls 91 is arranged. Each cap 90 has packing 92 placed within a groove formed therein, said packing bearing against said trunnions 57, to guard against the entrance of foreign matter into the bearing.

The trunnions at opposite ends of the grinding rolls 40, 41 have pinions 93 secured thereto, which are in mesh with the gear wheels 75 at opposite ends of the trunnions of the grinding rolls 39, and the teeth of said pinions and gear wheels are of sufficient depth to permit slight adjustment of the centers of said grinding rolls 40, 41 toward and from the center of the grinding roll 39, without causing them to move out of mesh, thus permitting adjustment of the rolls relatively while retaining the driving relation of the parts of the driving mechanism serving to rotate the grinding rolls 40, 41.

The substantially horizontally-disposed long arms of the bearing levers are associated with stop means to prevent movement of said levers in one direction and are spring-pressed in such direction and consequently yieldable in the opposite direction. For this purpose the end walls of the casing are provided with lugs 94 through which stop screws 95 are threaded, the screws projecting from said lugs a distance and bearing against the long arms of said bearing levers. Each of these stop screws has a hand wheel 96 at its outer end for conveniently adjusting the same, and a hand wheel 97 serving as a jamb nut is threaded onto said stop screws to maintain the same in adjusted position. The said lugs 94 are disposed above the long arms of the upper bearing levers and beneath the long arm of the lower bearing levers, and at opposite sides of said bearing levers additional lugs 98 are formed or otherwise provided on the end walls of said casing. Between said last-mentioned lugs and the long arms of the bearing levers, expansion springs 99 are interposed, one end of each expansion spring bearing against a lug 98 and its other end fitting into a socketed portion 100 on the long arm of its co-acting bearing lever. These springs serve to maintain the long arms of the upper bearing levers in their uppermost positions against their associated stop screws 95, and those of the lower bearing levers in their lowermost positions against their associated stop screws, and by reason of the short arms of said bearing levers being at obtuse angles to the long arms thereof and the pinions 93 being centered on said short arms, said short arms are caused to swing toward the center of the grinding roll 39 to the extent permitted by the several stop screws 95.

The end walls are provided with extensions 101 having raised arcuate regions 102 provided with graduation marks, the innermost mark being indicated by zero and each additional mark in succession indicating an added degree. Indicating fingers 103 are pivotally connected to each extension at its upper and lower ends, each of said fingers having a lug 104 extending inwardly from its hub or pivoted end at an obtuse angle thereto. Threaded through each of said lugs is a regulating screw 105 adapted to be adjusted to the desired position and bear against the outer sides of the adjacent bearing lever 77 or 78, as the case may be, which in the case of the upper bearing levers is the upper side, and in the case of the lower bearing levers, the under side thereof. These adjusting screws bear against said levers at the outer extremities of their long arms 81 and they are maintained in their adjusted positions by jamb nuts 106 which bear against the upper or outer sides of the lugs on the upper indicating fingers and against the outer or under sides of the lugs on the lower indicating fingers. Trigger springs 107 applied to said indicating fingers in the conventional manner serve to swing said fingers outwardly and the regulating screws 105 against the outer sides of the long arms of said bearing levers.

Both the regulating screws 105 and the stop screws 95 are adjusted so that when the grinding rolls are set at finest adjustment, the indicating fingers 103 will be at zero of the several series of graduations. The relative positions of the grinding rolls can be exactly determined by the positions of the indicating fingers, since after the rolls are set at closest adjustment and the indicating fingers point to the zero graduation marks, further adjustment can be readily made by means of the stop screws 95, whereupon the regulating screws 105 will move with the long arms of the bearing levers and cause the indicating fingers, through the action of the trigger springs 107, to move outwardly along the series of graduation marks and indicate the exact width or size of the passes 45 and 49 between the grinding rolls.

In the end walls of the casing at the inner ends of the extensions thereof, a rock shaft 108 is journaled, said rock shaft extending outwardly beyond said end walls and having a toggle-arm member 109 keyed or otherwise fastened thereto outside of each of said end walls and preferably in moving contact therewith. To each of the arms of each toggle-arm member, the short arm of an L-shaped toggle lever 110 is pivotally secured.

The outer ends of said toggle levers are pivotally and slidably connected to lugs 111 formed on the inner sides of the long arms of the bearing levers 77, 78, respectively. For this purpose said toggle levers are provided with slots 112 through which pivot bolts 113 are passed which are threaded into said lugs. The bearing levers at each end of the casing are therefore connected in pairs by the toggle-arm member, and toggle levers, which form a "quick-acting", or what may be termed "cam-operating" release mechanism, since upon rocking said rock shaft, the toggle-arm member is rotated and causes the long arms of the bearing levers to quickly swing toward each other against the action of the expansion springs 99, thereby moving the short arms of said bearing levers outwardly or in a direction away from the center of the grinding roll 39, thus quickly separating the rolls 40, 41 from said roll 39 and allowing any hard substance lodged between said rolls to pass therefrom. This quick acting release mechanism may also be used for stopping the machine and, if desired, for throwing the pinions into mesh after starting rotation of the grinding roll 39. For the purpose of operating said rock shaft, hand levers 114 are secured to opposite ends thereof, thus making it possible to quickly operate the machine from either end thereof, and since the extensions bearing the two sets of graduation marks are also arranged at opposite ends of the machine, adjustment can be effected at each end to correspond exactly with the adjustment made at the other end thereof, thereby assuring parallelism of the rolls and an even grind of coffee or other material from one end to the other of the rolls.

It is to be noted that by reason of the rolls 40 and 41 having the pinions 93 secured to the trunnions thereof and these pinions in mesh with the gear wheels 75 on the trunnions of the roll 39, the rolls 40, 41 are operated at a higher speed than said roll 39, owing to the fact that the driving pulley is at one or the other end of said last-mentioned roll. The rolls are therefore operated under a differential speed arrangement and this keeps them in clean condition.

Preparatory to placing the machine in operation, the rolls 40, 41 are placed in firm contact with the immovably centered or fixed roll 39; the indicating fingers 103 are set at zero, and the regulating screws 105 brought in contact with the outer ends of the long arms of the bearing levers 77, 78. At the same time, the stop screws 95 are adjusted to bear against the outer sides of said bearing levers. When the parts are in these positions, the exact fineness to which the coffee or other stock is to be ground, is determined by the movement of the indicating fingers 103 over the graduation marks on the arcuate regions 102, and this is effected by the stop screws 95 forcing the long arms of the bearing levers toward each other, the exact movement of said long arms being determined by the movement of the indicating fingers over said graduation marks, owing to the fact that the regulating screws follow in contact with the long arms of said bearing levers; this being caused by the action of the trigger springs 107. It will be apparent therefore that the exact size of the passes between the grinding rolls are determined without necessitating entrance into the machine and the passage of feeler gages between the rolls.

By employing and operating a quick release mechanism, such as the toggle-arm members 109 and toggle levers 110 constitute, the grinding operation can be quickly stopped; and in the event that large foreign matter enters between the rolls, the operation of this quick release mechanism will prevent damage to the rolls and allow quick passage of such foreign matter downwardly through the machine. Moreover, the machine can be started under what may be termed a "no-load" condition.

The pivotal and slidable connection provided between the quick release mechanism and the bearing levers 77 and 78 permit the rolls to separate slightly for the passage of small hard substances without causing actuation of any of the parts of said quick release mechanisms or the hand levers 114.

Figure 2:
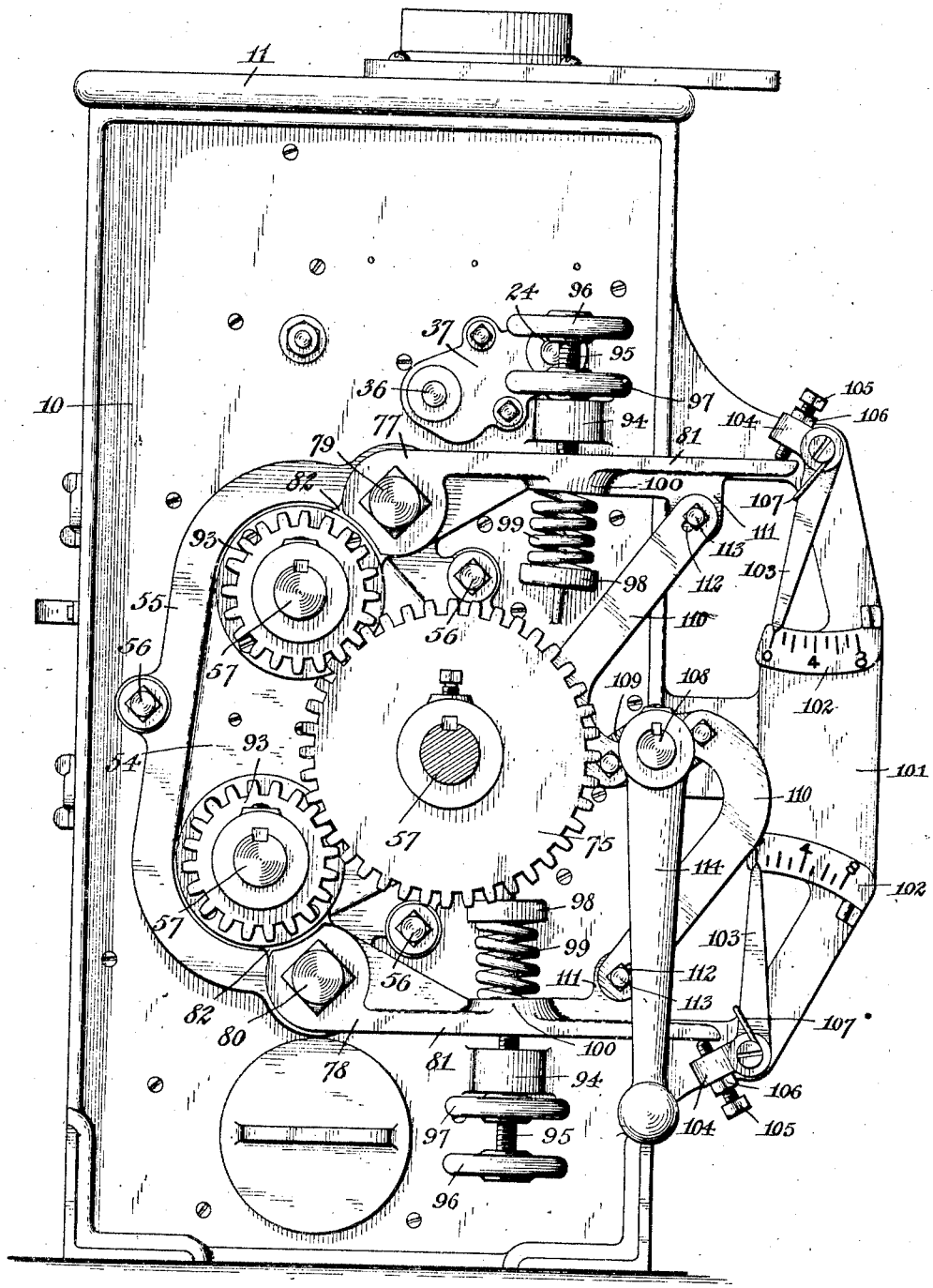
Fig. 2 is an elevation, viewed from the other end of the machine.

When the pinions of the grinding rolls 40, 41 are thrown out of mesh, due to the operation of the quick release mechanism, the toggle-arm members 109 will be moved counter-clockwise, as viewed in Fig. 2, and thrown beyond the vertical or dead center so that the parts will be practically locked in inoperative position, necessitating the exercise of manual effort, by operating one or the other of the hand levers 114, to return the toggle or release mechanism to normal position by a clock-wise movement of the toggle arm members.

My improved machine may be used as a "single run" grinder in which the coffee or other stock may be run through the machine once, or it may be utilized as a double run machine, in which case it would be mounted on a separator and arranged to deliver the ground stock thereinto, in which separator the coarse grindings would be separated from the finer and returned to the top of the machine by means of an elevator of other suitable mechanism and delivered into the opening 13 at the top, from which opening it will be passed through the return hopper and finally be delivered through the pass 49 between the permanently centered or fixed roll 39 and the adjustable roll 41 for re-grinding.

Figure 4:
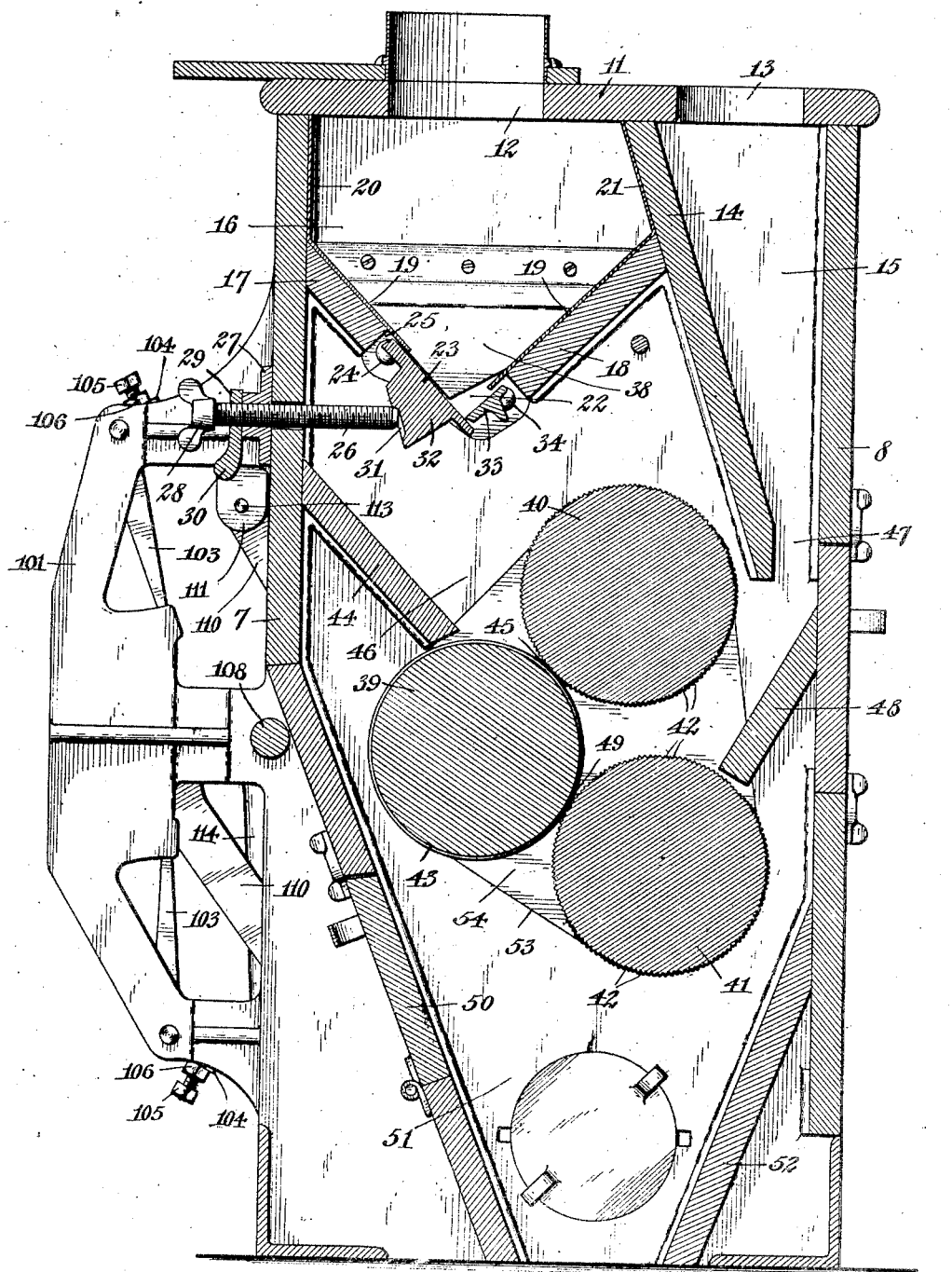
Fig. 4 is a transverse section taken on line 4—4, Fig. 3.

Examination of Fig. 4 will show that the first run of coffee or other material through the machine is through both the passes 45 and 49, and that the second run of material through the machine is through the pass 49 only, and it may be here stated that the corrugations on the adjustable roll 41 may be made somewhat finer than those on the adjustable roll 40, or by means of the stop screws 95 associated with the lower bearing levers 77 and the regulating screws 105 coacting with said bearing levers, the rolls may be so adjusted that when the various indicating fingers 103 are set at zero the lower adjustable roll 41 will be in firm contact with the permanently centered roll 39, while the upper adjustable roll 40 will be slightly spaced from said roll 39. Under such conditions, the pass 45 between the rolls 39 and 40 will be a trifle larger than the pass 49 between said roll 39 and the adjustable roll 41, the rolls 39 and 40 co-acting to break up the coffee beans or other stock to be ground, while the rolls 39 and 41 co-act to grind the broken material to the desired fineness.

The adjustable feed valve 23 is adjusted to regulate the space between the same and the vibrating feed valve 33 so as to properly control the feeding of the coffee beans or other material to the grinding rolls, the vibrating feed valve 33 serving to loosen up the coffee beans or other stock at the throat of the hopper and assure a continual and even feed of the same to the grinding rolls.

One of the trunnions of the vibrating feed valve, in the drawings the trunnion 35, extends out through the casting 37 at the same end of the machine a distance sufficient to fasten thereto a lever 115, the outer end of which is pivotally connected to the upper end of a link or pitman 116 eccentrically connected to the end of the adjacent trunnion of the upper grinding roll 40, as at 117.

Upon rotation of the grinding roll 40 the lower end of the link 116 is moved in a circular path by reason of its eccentric connection to one of the trunnions of said roll, thus causing the lever 115 to oscillate, which in turn causes vibration of the feed valve 33 to a sufficient extent to permit a continual but thin flow of stock between the same and the adjustable feed valve 23, and when this feed is found either excessive or insufficient, proper adjustment of said feed valve 23 is effected by the adjusting screw 26.

It will be apparent from the foregoing that various changes may be made in details of construction without departing from the spirit of my invention or sacrificing any of the advantages thereof, and Therefore what I claim is:—

1. In a grinding machine, three grinding rolls arranged so that one co-acts with each of the other, one of said rolls being circumferentially corrugated and co-acting with the others, said others being longitudinally corrugated.

2. A grinding machine having three grinding rolls arranged in triangular relation, one having its center in a plane to one side and between the others and said others being adjustable toward and from said first-mentioned roll, said first-mentioned roll being circumferentially corrugated and the other rolls being longitudinally corrugated.

3. In a grinding machine, the combination with a casing, of a plurality of grinding rolls within said casing arranged to provide two passes for the stock therebetween, means for independently adjusting each of two of said rolls with respect to the third roll, means at the exterior of said casing connected with said two rolls for indicating the predetermined adjustment of said two rolls relative to the third roll and for indicating corresponding further adjustment of each of said two rolls with reference to said third roll, and means co-acting with said adjusting means for quickly causing separation of said two rolls from said third roll and for automatically maintaining said rolls in separated condition after separation thereof.

4. In a grinding machine, the combination with a casing, of three grinding rolls within said casing arranged in triangular relation, one of said rolls being provided with end trunnions journaled in opposite walls of said casing and the two other rolls having end trunnions extending freely through said opposite walls, bearing levers arranged at the outer sides of said opposite walls and pivotally secured thereto between their ends, said bearing levers having short arms provided with bearings to receive the trunnions of said two last-mentioned rolls and long arms extending in corresponding directions from the pivoted points of said levers, a gear wheel on the trunnions journaled in said opposite walls, pinions on the trunnions extending freely through said opposite walls and in mesh with said gear wheel, springs acting against the long arms of said bearing levers to hold said pinions in mesh with said gear wheel, means to arrest the movement of said long arms under action of said springs, and indicating means operated by said bearing levers to indicate the relative positions of said grinding rolls.

5. In a grinding machine, the combination with a casing having opposite walls provided with alined bearings and alined openings, a pair of grinding rolls within said casing having end trunnions, the end trunnions of one of said rolls being journaled in said bearings and extending outwardly therefrom and the end walls of the other roll extending outwardly through said openings, gear wheels on the end trunnions of said first-mentioned roll, pinions on the trunnions of said second-mentioned roll in mesh with said gear wheels, bearing levers pivotally connected to said opposite walls and having bearings in which the trunnions of said second-mentioned roll are journaled, means for adjusting said bearing levers, indicating mechanism co-acting with said levers to indicate the exact relative positions of said grinding rolls, and quick acting means for manually separating said rolls.

6. In a grinding machine, a grinding roll journaled on immovable centers, a second grinding roll co-acting with said first-mentioned grinding roll, pivoted elements in which said second grinding roll is journaled, said pivoted elements being adjustable to determine the fineness of grind and being adapted for quick movement to cause quick separation of said rolls, and toggle mechanism connected with said pivoted elements to cause quick movement thereof to separate said rolls.

7. In a grinding machine, a grinding roll journaled on immovable centers, a second grinding roll co-acting with said first-mentioned grinding roll, pivoted elements in which said second grinding roll is journaled, said pivoted elements being adjustably arranged to determine the fineness of grind and being adapted for quick movement to cause separation of said rolls, a shaft journaled for rocking movement, an operating lever for said shaft, toggle arms extending from said shaft, and a toggle lever connecting each toggle arm with one of said pivoted elements to cause quick movement of said pivoted elements when actuating said operating lever and cause separation of said rolls.

8. In a grinding machine, the combination with a casing, of a grinding roll journaled in the end walls of said casing, a second grinding roll also within said casing parallel with said first-mentioned grinding roll, and means outside of said casing at opposite end walls for journaling said second grinding roll, for adjusting the same for the desired fineness of grind while maintaining parallelism between said rolls, and for quickly separating said rolls while maintaining parallelism therebetween.

9. In a grinding machine, the combination with a casing, of three grinding rolls arranged within said casing to provide two successive passes, a gear wheel for driving one of said rolls, pinions in mesh with said gear wheel for driving the other rolls, pivoted bearing levers having bearings for opposite ends of said other rolls, springs for maintaining said levers in position to cause meshing of said pinions with said gear wheel, stop means to limit the movement of said levers under action of said springs, a pivoted indicating finger co-acting with each of said levers, a toggle member mounted for rocking movement, toggle levers connecting said toggle member with said bearing levers and adapted to correspondingly actuate the same against the action of said springs for moving said two last-mentioned grinding rolls away from said first-mentioned roll.

10. In a grinding machine, the combination with a casing having end walls provided with alined bearings and two pairs of alined openings, said end walls having threaded lugs and spring-bearing lugs, a grinding roll within said casing having end trunnions journaled in said alined bearings, a pair of grinding rolls co-acting with said first-mentioned grinding roll and each having trunnions extending through a pair of said alined openings, bearing levers arranged in pairs at opposite ends of the machine and pivotally secured to said end walls, said bearing levers having short arms provided with bearings for the trunnions of said pair of grinding rolls and long arms extending laterally in corresponding directions, a spring interposed between each spring-bearing lug and the long arm of one of said bearing levers, a stop screw threaded through each threaded lug of said end wall and bearing against the long arm of one of said bearing levers in opposition to its spring, an extension formed on said end walls having arcuate surfaces provided with graduations, a pivoted indicator for each arcuate surface having a lug extending from its boss, a regulating screw extending through said lug and bearing against the long arm of one of said bearing levers, a shaft extending parallel with said rolls, a toggle member on said shaft at each end of said casing, and toggle levers connecting the arms of each toggle member with the long arms of said bearing levers at the same end of the machine.

11. In a grinding machine, the combination with a casing having end walls, a grinding roll journaled in said end walls, a pair of grinding rolls co-acting with said first-mentioned grinding roll, a pair of levers pivoted between their ends to opposite end walls of said casing and having bearings for said pair of grinding rolls at one end thereof, means for adjusting said levers to determine the size of the passes between said rolls, and quick releasing mechanism at each end of said machine connected with said levers and adapted to be operated from either end of said machine, said quick releasing mechanism serving to separate said rolls and having connection with said levers to permit adjustment of the latter without moving any of the parts of said quick releasing mechanism.

12. In a grinding machine, three grinding rolls, means for movably supporting two of said grinding rolls at opposite ends of the machine, including two substantially parallel spaced arms at each end of the machine, and a toggle member at each end of the machine, and toggle levers pivotally connected to opposite arms of each toggle member and having combined pivotal and slidable connection with the arms of said movable supporting means.

13. In a grinding machine, the combination with a casing, of three grinding rolls arranged in said casing in triangular relation, one of said rolls being journaled on fixed centers, means to movably support opposite ends of the other grinding rolls, said means including correspondingly-directed spaced arms at each end of the casing, and means for indicating from each of said arms the position and parallelism of each of said movably supported grinding rolls with respect to said first-mentioned grinding roll.

In testimony whereof I affix my signature.

CHARLES T. HOWSON.